United States Patent
Hasan et al.

(10) Patent No.: US 7,672,666 B2
(45) Date of Patent: Mar. 2, 2010

(54) METHOD AND SYSTEM FOR IMPLEMENTING VEHICLE FUNCTIONS THROUGH A MOBILE COMMUNICATION DEVICE

(75) Inventors: Peggy Hasan, Aurora, IL (US); Sandra Lynn True, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 793 days.

(21) Appl. No.: 10/792,312

(22) Filed: Mar. 3, 2004

(65) Prior Publication Data

US 2005/0197174 A1 Sep. 8, 2005

(51) Int. Cl.
H04M 3/00 (2006.01)
H04B 1/40 (2006.01)
(52) U.S. Cl. .................... 455/420; 455/88; 455/352
(58) Field of Classification Search .............. 455/88, 455/344, 352, 419, 420, 556.1, 575.9; 340/5.61, 340/825.22, 825.72, 870.11; 307/10.1, 10.6
See application file for complete search history.

(56) References Cited

U.S. PATENT DOCUMENTS

| | | | |
|---|---|---|---|
| 6,308,083 B2 * | 10/2001 | King .................... 455/556.1 |
| 6,323,566 B1 * | 11/2001 | Meier .................... 307/10.2 |
| 6,522,029 B1 | 2/2003 | Bell et al. |
| 6,535,107 B1 * | 3/2003 | Bartz .................... 340/5.2 |
| 6,617,975 B1 | 9/2003 | Burgess |
| 6,621,406 B2 | 9/2003 | Kumano |
| 6,624,758 B1 | 9/2003 | Omata et al. |
| 6,639,511 B2 | 10/2003 | Haruna et al. |
| 6,677,851 B1 | 1/2004 | Losey |
| 6,792,295 B1 * | 9/2004 | Hanevich et al. ......... 455/569.1 |
| 7,146,129 B2 * | 12/2006 | Bostrom et al. ............ 455/3.03 |
| 7,251,331 B2 * | 7/2007 | Kansala et al. ............. 380/270 |
| 2003/0103482 A1 * | 6/2003 | Van Bosch .................. 370/338 |
| 2004/0012501 A1 * | 1/2004 | Mazzara et al. ........ 340/870.11 |
| 2004/0066092 A1 * | 4/2004 | Muller ..................... 307/10.1 |

\* cited by examiner

Primary Examiner—Sonny Trinh (57) ABSTRACT

A method and system for implementing vehicle functions through a mobile device are provided. More particularly, a technique is implemented for initiating selected vehicle functions through a remote mobile device such as a mobile phone, rather that through a key fob. The system includes network functionality contained within the primary switching element of the network, e.g., a mobile switching center (MSC), to receive an access code (such as *89) from a user. The switching element subsequently transmits command signal(s) via a base station to a vehicle to perform vehicle functions such as locking, unlocking and starting.

25 Claims, 5 Drawing Sheets

METHOD AND SYSTEM FOR IMPLEMENTING VEHICLE FUNCTIONS THROUGH A MOBILE COMMUNICATION DEVICE

BACKGROUND OF THE INVENTION

This invention relates to a method and system for implementing vehicle (e.g., automobile) functions through a mobile communication device. More particularly, the invention is directed to a technique for initiating selected vehicle functions through a remote mobile device such as a mobile phone rather than through a key fob. The system includes network functionality contained within the primary switching element of the network, e.g., a mobile switching center (MSC), to receive an activation code (such as *89) from a user. The switching element subsequently transmits command signal(s) via a base station to a vehicle to perform vehicle functions such as locking, unlocking and starting.

While the invention is particularly directed to the art of wireless, remote control of vehicle functions using a mobile communication device, and will be thus described with specific reference thereto, it will be appreciated that the invention may have usefulness in other fields and applications. For example, the invention may be used in any circumstances where use of a mobile communication device such as a phone could provide a substitute for wireless control of a remote system.

By way of background, most people would agree that it is very frustrating to realize that one has locked car keys in one's car, or of even more import, lost car keys while away from home. Unfortunately, despite the attempts of most people to prevent such a happening, or attempts to prepare for such an event by, for example, keeping an extra key in your wallet or purse, these inopportune circumstances continue to occur.

Prior systems exist that provide remote keyless entry to vehicles. These systems and their functions are well known. Remote vehicle start-up devices are also known. For example, U.S. Pat. No. 6,617,975 B1 to Burgess, U.S. Pat. No. 6,621,406 B2 to Kumano, U.S. Pat. No. 6,624,758 B1 to Omata, et al., U.S. Pat. No. 6,677,851 B1 to Losey, U.S. Pat. No. 6,522,029 B1 to Bell, et al., and U.S. Pat. No. 6,639,511 B2 to Haruna, et al. represent examples of keyless entry and/or remote start-up systems that are known to those in the field and are incorporated herein by reference.

However, these existing remote vehicle devices are typically subject to a small radius from which they can be activated. Moreover, they are typically placed on the key chain of the user or integral with the key set. Therefore, the above-noted frustrations and difficulties associated with losing keys or locking keys in one's vehicle are not resolved.

The present invention contemplates a new and improved method and system that resolves the above-referenced difficulties and others.

SUMMARY OF THE INVENTION

A method and system for implementing vehicle functions through a mobile device are provided. According to one aspect of the invention, telecommunications network support is implemented for providing locking, unlocking and start-up functions for vehicles—through the use of a mobile communication device such as a mobile phone.

In another aspect of the invention, the system comprises a recognition module operative to recognize a request to initiate the process for performing vehicle functions from the mobile communication device, an authentication module operative to authenticate that the user is valid and determine vehicles upon which the mobile communication device may initiate the vehicle functions, a query module operative to query the user through the mobile communication device as to which of the vehicle function is to be performed and a communication module operative to transmit command signals to the vehicle to perform the selected function based on results of the query.

In another aspect of the invention, the request comprises an activation code.

In another aspect of the invention, the authentication module is operative to access mobile identification numbers (MINs) and vehicle identification numbers (VINs) stored in a subscriber database.

In another aspect of the invention, the vehicle functions comprise at least one of locking doors on the vehicle, unlocking doors on the vehicle, and starting the vehicle.

In another aspect of the invention, the system further comprises a receiver disposed within the vehicle operative to receive the command signals from the communication module.

In another aspect of the invention, the system further comprises a control module disposed within the vehicle operative to initiate the selected function based on the command signals received by the receiver.

In another aspect of the invention, the system further comprises a transceiver disposed within the vehicle operative to receive the command signals from the communication module and transmit signals back to the communication module.

In another aspect of the invention, the system further comprises a control module disposed within the vehicle operative to initiate the selected function based on the command signals received by the transceiver.

In another aspect of the invention, the system further comprises a second communication module operative to provide information to the transceiver to transmit the signals.

In another aspect of the invention, a method comprises receiving a request to initiate the process for performing vehicle functions from the mobile communication device, authenticating that the user is valid, determining vehicles upon which the mobile communication device may initiate the vehicle functions, querying the user through the mobile communication device as to which of the vehicles function is to be performed and transmitting command signals to the vehicle to perform the selected function based on results of the query.

In another aspect of the invention, receiving of the request to initiate comprises receiving an activation code.

In another aspect of the invention, the authenticating that the user is valid comprises accessing a subscriber database.

In another aspect of the invention, the determining of vehicles upon which the mobile communication device may initiate the selected vehicle functions comprises accessing mobile identification numbers (MINs) and vehicle identification numbers (VINs) stored in a subscriber database.

In another aspect of the invention, the vehicle functions comprise at least one of locking doors on the vehicle, unlocking doors on the vehicle, and starting the vehicle.

In another aspect of the invention, the method further comprises receiving the command signals from the communication module by a receiver disposed within the vehicle.

In another aspect of the invention, the method further comprises initiating the selected function based on the command signals received by the receiver.

In another aspect of the invention, the method further comprises receiving the command signals from the communication module by a transceiver.

In another aspect of the invention, the method comprises initiating the selected functions based on the command signals received by the transceiver.

In another aspect of the invention, the method comprises transmitting signals back to the communication module.

In another aspect of the invention, a system is provided having means to perform the method of the present invention.

An advantage of the present invention resides in the fact that, by placing the contemplated functionality in the mobile telecommunications network, a request to lock a car may be made from inside a shopping mall or some other distant location, instead of from within a required three foot radius around the vehicle.

Another advantage of the present invention resides in the fact that, by using the telecommunications network to perform such functionality, a layer of security and authentication is added to prevent accidental or malicious requests.

Another advantage of the present invention resides in the fact that, by establishing a correlation between mobile devices and vehicles as part of ordinary network intelligence, this correlation information can be easily changed when new mobile devices are purchased or when new vehicles are purchased.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

The present invention provides telecommunications network support for allowing a mobile subscriber to initiate a process to remotely lock or unlock a vehicle through the use of a mobile handset and also allow the mobile subscriber to start-up a vehicle through the use of the mobile handset. More particularly, a mobile switching center (MSC) within the network, upon receiving a request from the mobile device, may unlock, lock, or start-up a vehicle by simply locating the vehicle (which in at least one embodiment of the invention is within the same cell area) and sending appropriate command signals or messages to the vehicle to perform the requested function. In addition, security verification of a request to lock, unlock or start a vehicle is provided. As a further benefit, the mobile subscriber may establish, change, or delete an association between a mobile device and a motor vehicle(s) using, for example, mobile identification numbers (MINs) and vehicle identification numbers (VINs). Of course, it should be understood that other vehicle functions (such as light blinking, horn honking, . . . etc.) may be initiated according to the present invention.

A receiver or transceiver device that is used to communicate with the telecommunications network is preferably disposed within a vehicle and incorporated in or connected to an existing remote start-up device or remote unlock/lock device in the vehicle. In this regard, the mobile subscriber may install (or have installed) or simply activate and tune an existing receiver or transceiver device in the vehicle. The mobile subscriber then establishes a relationship in the subscriber database between his/her mobile and his/her motor vehicles by correlating within the database his/her Mobile Identification Numbers (MINs) (associated with his/her mobile devices) with the Vehicle Identification Numbers (VINs) (associated with his/her vehicles). The mobile subscriber may then request that the network unlock/lock/start-up the vehicle by pressing a button on the mobile, by entering a special code (e.g., #867), or by dialing a series of digits.

The telecommunications network may respond to the mobile request by first verifying the authenticity of the request (e.g., may request a password to be entered). The telecommunications network locates the motor vehicle, if necessary, and transmits a message that requests that the vehicle be either locked/unlocked/started. The receiver or transceiver device in the vehicle receives the message. The requested functions are then performed by the remote entry device or remote start-up device. Optionally, if a transceiver is used, an acknowledgement can be sent from the requesting mobile to the network.

Using the present invention, frustrating situations brought on by the loss of keys or locking of keys within the vehicle can be avoided. For example, implementation of the present invention is useful where a subscriber has driven away from home, gotten out of the car, and locked the keys in the car. Assuming the subscriber has access to the subscriber's mobile phone, the activation code for the services provided under the present invention need simply be dialed to ultimately unlock the vehicle. As a further example of a beneficial use of the services provided according to the present application, consider a subscriber sitting in the football stadium and suddenly realizing that the car is not locked, and that valuables are in view. Assuming the subscriber would rather not leave the game, the activation code is dialed and the car is automatically locked. As a still further example of a beneficial use of the present invention, consider a situation where a subscriber is away from home and loses keys. Rather than requiring a friend or family member to travel to deliver another set of keys, all that needs to be done is the dialing of a code or pressing of a specialized button on a mobile device. The door can thus be unlocked and the vehicle may also be started. Of course, these situations represent mere examples of the many beneficial uses of the present invention.

Figure 1:
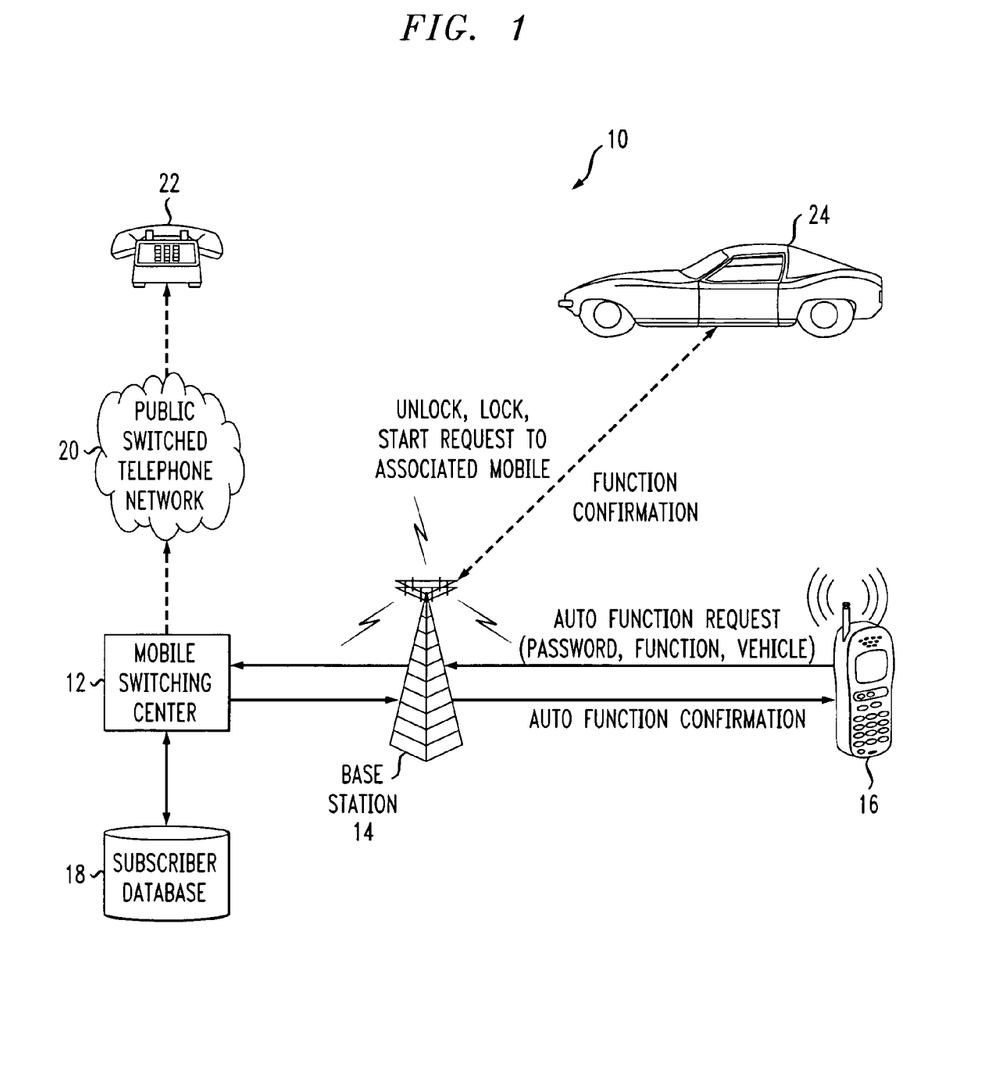
FIG. 1 is an illustration of an exemplary network into which the present invention may be incorporated.

Referring now to the drawings wherein the showings are for purposes of illustrating the preferred embodiments of the invention-only and not for purposes of limiting same, FIG. 1 provides a view of an exemplary network 10 into which the present invention may be incorporated. As shown, the network 10 includes a mobile switching center (MSC) 12 that communicates with a base station 14. Base station 14 is capable of communicating via an air interface with a variety of mobile devices such as mobile device 16. The mobile switching center (MSC) 12 is also connected to a subscriber database 18 and a public switched telephone network (PSTN) 20. It will be understood that the public switched telephone network (PSTN) 20 comprises and/or is in communication with a variety of network elements such as telephone 22. Notably, according to the present invention, the automobile, or vehicle, 24 is in communication with the base station 14.

It should be understood that the network 10 may take a variety of configurations and may include a variety of components that will be apparent to those of skill in the art, yet such a modified network may still provide an environment into which the present invention can be implemented. For example, as is well known, the public switched telephone network (PSTN) 20 may take a variety of forms. It should also be understood that base station 14 is illustrated as communicating with the vehicle 24; however, a variety of other base stations (or equivalent elements) may also be present within the network and, in at least one embodiment, one of those other base stations may be communicating with the vehicle 24 or the user. The mobile device 16 is illustrated as a mobile phone but any mobile communication device, such as a personal digital assistant (PDA), pager, . . . etc., may be used to implement the invention. Further, the vehicle 24 is shown as an automobile; however, it will be understood that the vehicle may take a variety of forms including a truck, a bus, commercial equipment, . . . etc.

As shown, the network 10 also incorporates the subscriber database 18. It will be appreciated that the subscriber database 18 may have modifications incorporated therein, e.g. additional data fields, to accommodate the present invention. For example, the subscriber database 18 should include sufficient information (e.g., a flag set in a data field) so that the mobile switching center (MSC) 12 can determine if a user of a particular mobile device subscribes to services contemplated by the present application. Moreover, the subscriber database 18 preferably includes information so mobile devices can be correlated to vehicles to which the mobile devices are permitted to initiate vehicle functions. In this regard, the subscriber database 18 preferably includes not only mobile identification numbers (MINs) but also vehicle identification numbers (VINs) for the appropriate vehicles. Moreover, by manipulating the subscriber database, the mobile subscriber may establish, change, or delete an association between a mobile and a motor vehicle(s) using, for example, mobile identification numbers (MINs) and vehicle identification numbers (VINs).

In addition, the mobile switching center (MSC) 12 is modified to accommodate the present invention, as will be described hereafter. However, it should be understood that the mobile switching center 12 performs a variety of functions and includes a variety of elements that are not shown or described herein for purposes of convenience of explanation. Moreover, the mobile switching center 12 is illustrated as the primary switching element of the network shown. It should be understood that other primary switching elements in different types of networks or different generations of networks may also be used to implement the present invention.

In operation, the network 10 implements the present invention as alluded to above. That is, a mobile communication device 16 is used to send a vehicle function request, or activation code, to base station 14. Base station 14 then transmits the signals to the mobile switching center (MSC) 12. Once the mobile switching center (MSC) 12 recognizes the request as one to perform vehicle functions, the mobile switching center (MSC) 12 communicates with the mobile device 16 through the base station 14 to determine which of a selected number of functions should be performed. The mobile switching center (MSC) 12 also authenticates and verifies the user and the request by accessing the subscriber database 18. As noted above, the subscriber database 18 is preferably modified according to the present invention to include data fields to allow for the verification and authentication process to be completed.

Once the user and the request are verified and a determination is made as to the specific vehicle function which is to be performed, the mobile switching center (MSC) 12 sends command signals through the base station 14 to the vehicle 24 to perform those functions. As will be described in greater detail below, the vehicle 24 includes modules that allow the vehicle functions to be performed remotely, as described.

Figure 2:
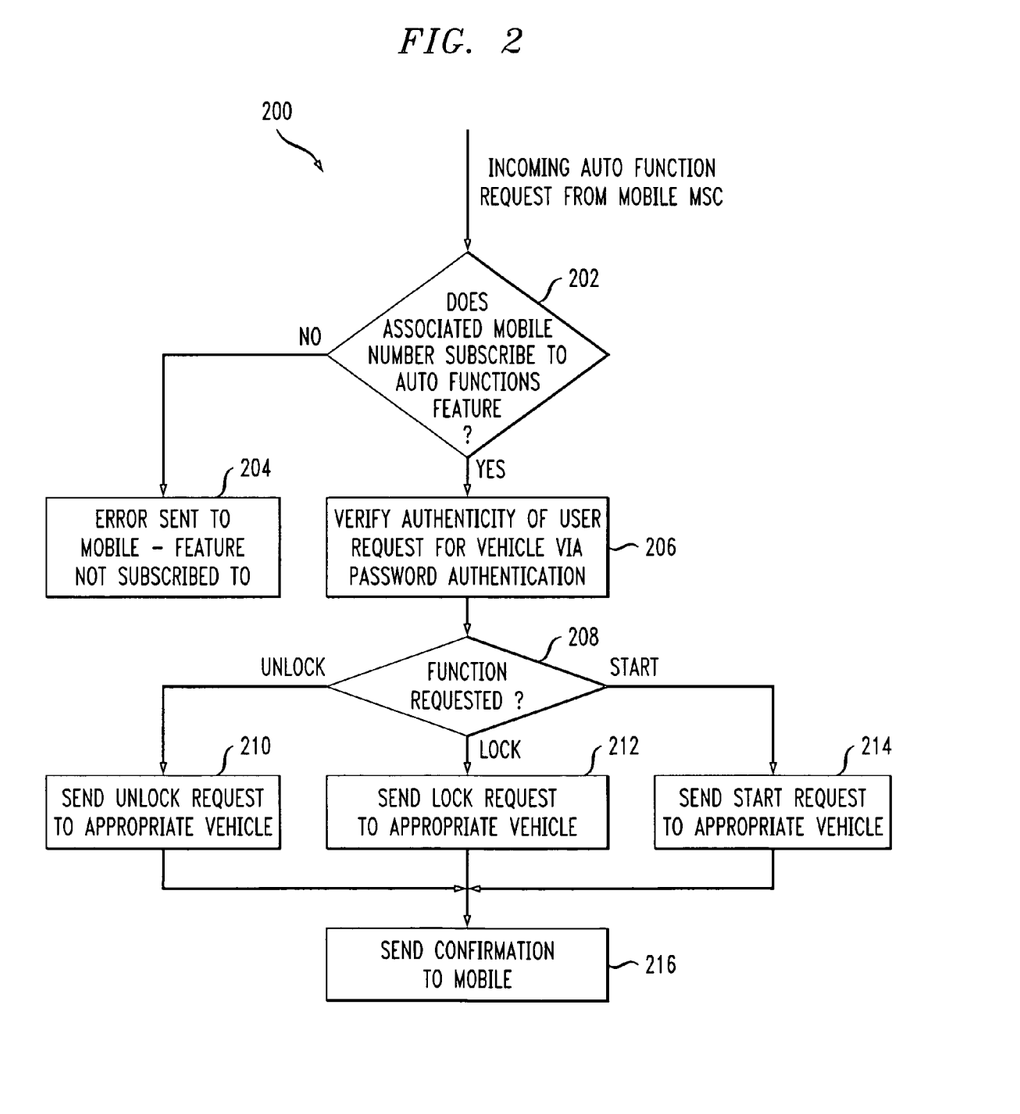
FIG. 2 is a flow chart illustrating a method according to the present invention.

Referring now to FIG. 2, a flow chart for a method 200 is illustrated. The method 200 is implemented in software routines that are run within the mobile switching center (MSC) 12 to facilitate the operation described above. As shown, an incoming vehicle function request (in the form of, for example, an activation code) is received by the mobile switching center (MSC) 12 from the mobile device 16. A determination is made as to whether the user of the mobile device 16 subscribes to the features implemented according to the present invention (step 202). The subscriber database 18 is accessed to accomplish this task. If not, an error is sent to the mobile device (step 204). If, however, it is determined that there is a valid subscription, vehicles upon which the mobile communication device may initiate the selected vehicle functions are determined by using the stored mobile identification number (MIN) to retrieve a vehicle identification code such as a Vehicle Identification Number (VIN), which is also stored in the subscriber database 18 (step 206). This process verifies the vehicles upon which the mobile device 16 may initiate vehicle functions. It should be understood that further security measures may also be implemented at this point in the process. For example, a password may be requested by the mobile switching center (MSC) 12. The mobile switching center (MSC) 12 then queries the user as to which specific function is requested (step 208). If an unlock function is requested, an unlock request is sent to the appropriate vehicle (step 210). If a lock function is requested, a lock request is sent to the appropriate vehicle (step 212). Last, if the starting function is requested, a start request is forwarded on to the appropriate vehicle (step 214). Optionally, a confirmation signal is also transmitted between the vehicle 24 and the base station, and then subsequently to the requesting mobile device (step 216).

It should be appreciated that the software routine of the method 200 implemented within the mobile switching center (MSC) 12 may take a variety of forms, dependent upon the particular software and hardware available. It should further be appreciated that the mobile switching center (MSC) 12 runs a variety of other routines not specifically described herein, which are well known in the art. For example, the mobile switching center (MSC) 12 operates to establish communication with the vehicle, i.e., the receiver or transceiver within the vehicle, so that the vehicle functions can be performed.

In one embodiment to be described below, the vehicle 24 is already within the cell area of the base station 14, so no sophisticated location process is necessary. However, in another embodiment of the invention described below, the mobile switching center will also function to locate the vehicle, which could be in cell site areas other than that associated with the base station 14. In this case, the process for doing so would be the same as the well known processes for locating cell phones within a network. As such, the transceiver acts as an operating cell phone that is registered on the network. It should be appreciated that locating the vehicle does not necessarily entail determining the precise geographic location of the vehicle as might be desired for other purposes. For purposes of the present invention, it need only be determined in which cell site area the vehicle is located so that a communication path can be established.

Figure 3:
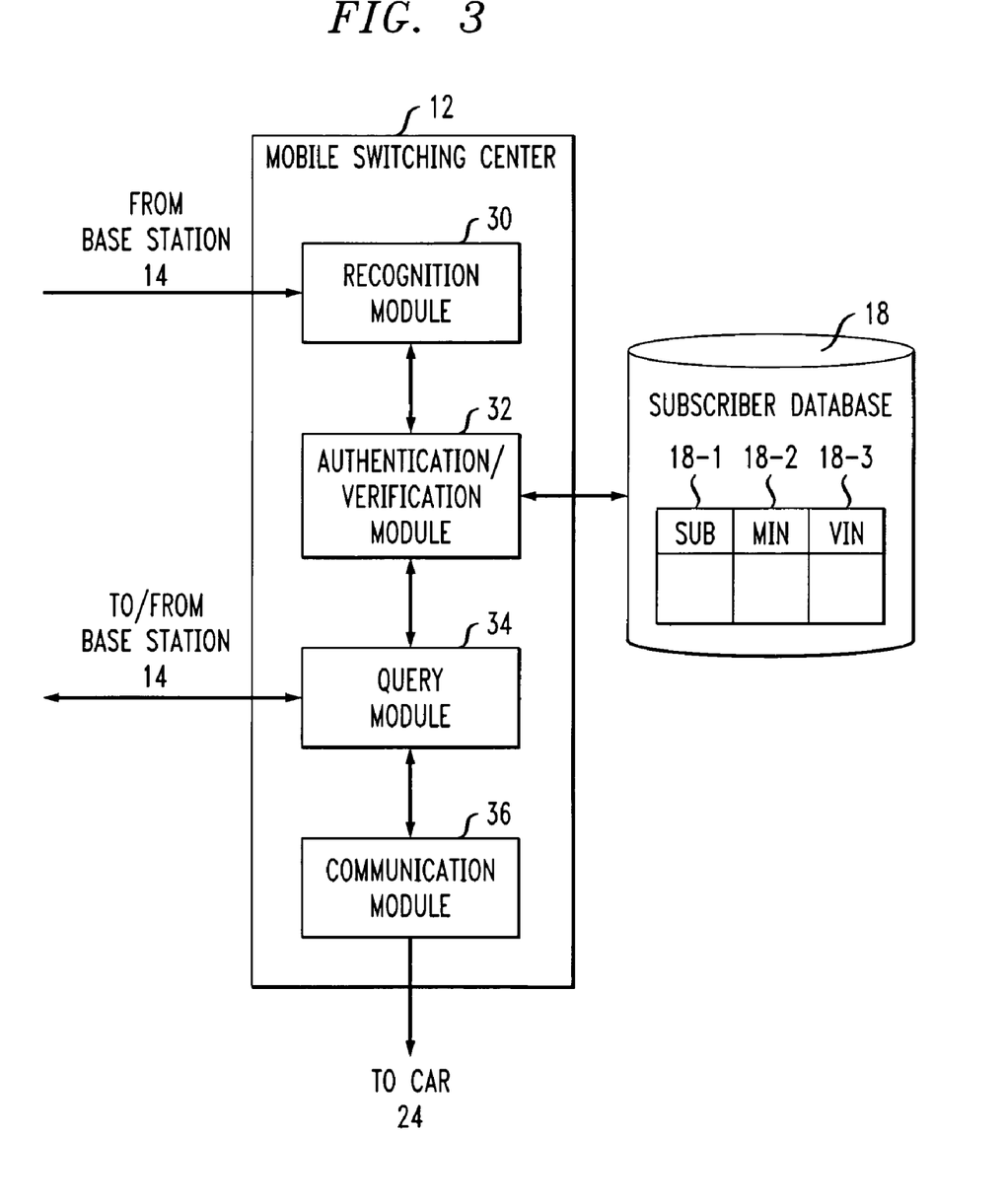
FIG. 3 is a functional block diagram of a mobile switching center according to the present invention.

Referring now to FIG. 3, the mobile switching center (MSC) 12 is illustrated. Again, it should be appreciated that the mobile switching center (MSC) performs many functions for the network and includes many elements that are not shown or described herein. The elements shown or described are used to implement the present invention. Moreover, the functionality of the mobile switching center according to the present invention is implemented by way of software routines having modules as described herein. Of course, appropriate hardware configurations will also be used, as those of skill in the art will appreciate.

As shown, mobile switching center (MSC) 12 includes a recognition module 30, and an authentication/verification module 32. The authentication/verification module 32 communicates with the subscriber database 18. In addition, the mobile switching center (MSC) 12 includes a query module 34 and a communication module 36.

In operation, the mobile switching center (MSC) 12 receives a request (e.g., an activation code) from the base station 14 through the recognition module 30. This request originates with, for example, a subscriber using the mobile device 16. Recognition module 30 determines, from the request, the service that is sought to be implemented. Here, it determines that the request is one in which vehicle functions will be initiated and ultimately performed. In this regard, the request from the mobile device that passes through base station 14 is preferably in the form of an activation code (such as *89). Recognition module 30 recognizes this activation code as one in which vehicle functions are requested. This recognition process is similar to processes for recognizing other activation codes that may be implemented on the network to perform other functions.

The authentication/verification module 32, based on the recognition of a vehicle function request, verifies that the user of the mobile device from which the request originated actually subscribes to the service. This is accomplished by accessing the subscriber database 18. In addition, the authentication/verification module 32 retrieves from the subscriber database 18 the vehicle identifications numbers (VINs) that the subscriber is permitted to access according to the subscription. This is accomplished by using the mobile identification numbers (MINs) for the subscribers. The database 18 is shown as having the additional data fields (e.g., a subscriber data field 18-1, a mobile identification number (MIN) data field 18-2, and a vehicle identification number (VIN) data field 18-3) described above. Of course, other data fields (not shown) are typically present in the subscriber database 18.

The query module 34 then queries the user through the base station 14 as to the specific functions that are requested to be performed. For example, the query module 34 queries the user to determine if the lock function, unlock function or start function are desired. Once this determination is made, the communication module 36 performs the task of locating the vehicle, if necessary, and transmitting the appropriate command signals to the vehicle, through the base station 14, to perform the desired function.

It should be understood that the command signals, or messages, transmitted from the mobile switching center (MSC) 12 to perform the vehicle functions may take a variety of forms that are well known to those skilled in the art. For example, referring now to FIG. 4, a command signal may take a format such as example format 400. As illustrated, the message format 400 includes a header 402, mobile identification number (MIN) field 404, vehicle identification number (VIN) field 406, function code field 408 and trailer 410. The function code field 408 content will vary according to the requested function (e.g., lock, unlock, or start). This example format would be used where the vehicle 24 includes a receiver only, as opposed to a transceiver. Accordingly, a communication path is established, then the function code is sent to the vehicle. Of course, it should be understood that the format 400 will vary in cases where a transceiver is located on the vehicle, as those of skill in the art will appreciate.

Figure 4:
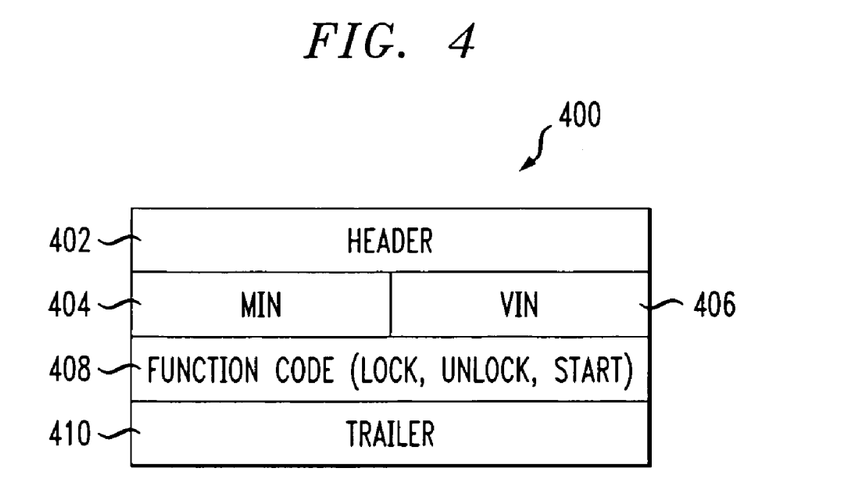
FIG. 4 is a representative showing of an exemplary message format according to the present invention.

However, regardless of the form taken, the command signals preferably include message content so that the vehicle receiving the command can actually perform the requested functions. The vehicle may also include elements capable of verifying that the commands are intended for it. In cases where a transceiver is implemented on the vehicle, the vehicle may be registered on the network to allow for ease of locating the vehicle.

Figure 5:
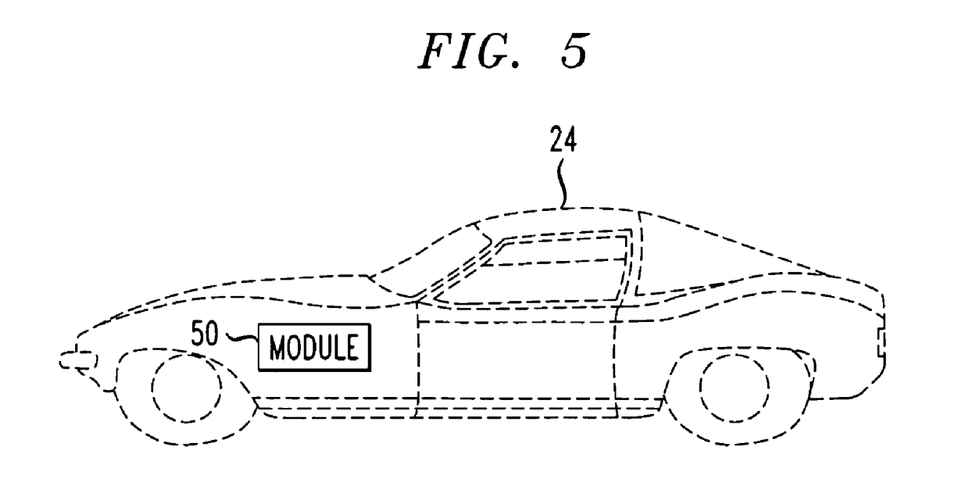
FIG. 5 is an illustration of an vehicle including a module used to implement the present invention.

Referring now to FIG. 5, the vehicle 24 is illustrated as including a module 50 for receiving communications from and, in some embodiments, transmitting to the mobile switching center (MSC) 12 through the base station 14. The module 50, and any other associated circuitry, may be disposed at any convenient location on the vehicles.

Figure 6:
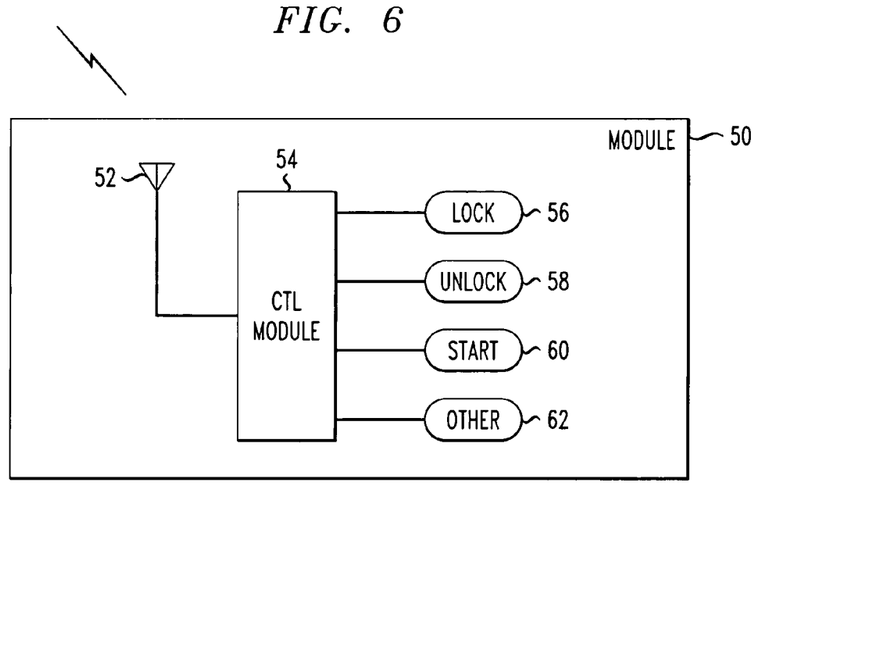
FIG. 6 is a block diagram of the module of FIG. 5 according to the present invention; and, FIG. 7 is a block diagram of an alternative embodiment of the module of FIG. 5 according to the present invention.

More specifically, FIG. 6 illustrates one embodiment of the module 50. As shown, the module 50 includes a receiver 52 connected to a control module 54. Control module 54 is, likewise, connected to a variety of forms of circuitry that serve to perform a variety of vehicle functions.

The receiver 52 may take any of a multitude of forms well known to those skilled in the communication field or the keyless entry field. In this regard, any receiver that is currently used in conventional keyless circuitry may suffice so long as it is tuned to the appropriate frequency to receive signals from the mobile switching center (MSC) 12 through, for example, the base station 14. Alternatively, the conventional receiver may be replaced with one that is specifically designed to receive signals from the mobile switching center (MSC) 12 through, for example, the base station 14. Moreover, it should be understood that the frequency at which the base station 14 and the receiver 52 communicate may be selected to be within the typical wireless range (e.g. the cellular 850 band or the PCS 1900 band) or within the typical keyless entry range.

The control module 54 preferably functions to receive the command signals from the base station 14. As noted above, the command signals contain sufficient message content to allow the control module 54 to recognize the selected vehicle function as well as vehicle identification information, such as a vehicle identification number (VIN).

As illustrated, control module 54 is connected to a lock module 56, an unlock module 58, a start module 60 and other function module 62 (to accommodate other functions that may be performed by the system). It should be appreciated that the modules 56, 58, 60 and 62 are merely shown in representative form. It is understood that these modules may well include other software routines and circuitry to accommodate requested vehicle functionality. However, this variety of routines and circuitry are well known to those of skill in the keyless entry field.

For example, U.S. Pat. No. 6,617,975 B1 to Burgess, U.S. Pat. No. 6,621,406 B2 to Kumano, U.S. Pat. No. 6,624,758 B1 to Omata, et al., U.S. Pat. No. 6,677,851 B1 to Losey, U.S.

Pat. No. 6,522,029 B1 to Bell, et al., and U.S. Pat. No. 6,639,511 B2 to Haruna, et al. represent examples of keyless entry and/or remote start-up systems that are known to those in the field and are incorporated herein by reference. Again, other examples exist so the functionality described in FIG. 6 is simply a representative sampling.

Figure 7:
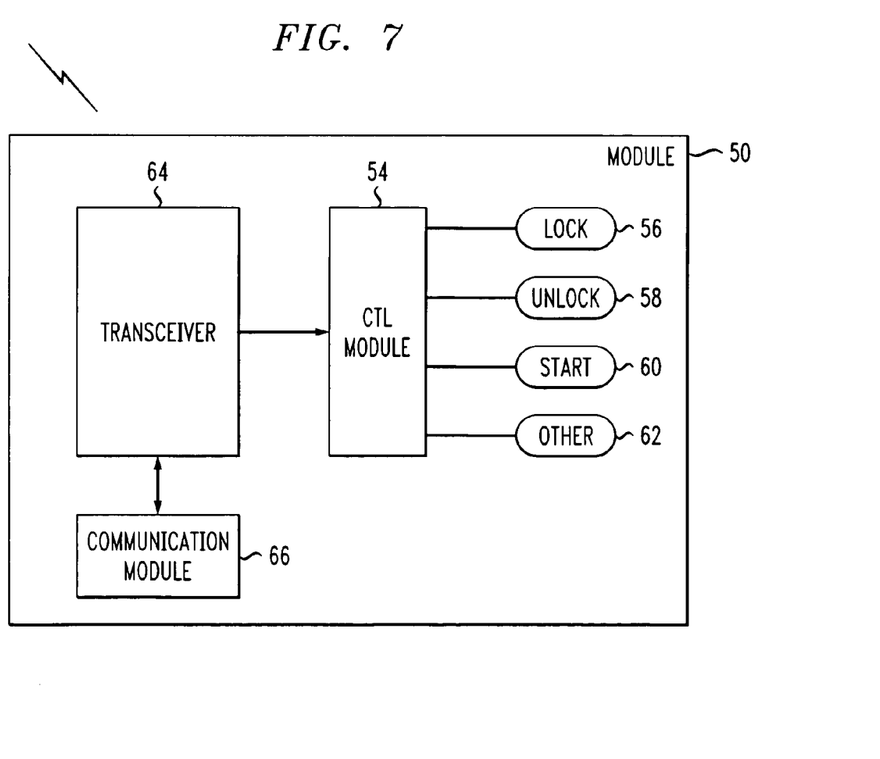

Referring now to FIG. 7, an alternative embodiment of the module 50 is illustrated. As shown, a transceiver 64 is in communication with a control module 54 which, in turn, is in communication with a lock module 56, unlock module 58, start module 60 and other function module 62. The transceiver 64 is also connected to a communication module 66.

Like the receiver 52, the transceiver 64 may take any of a multitude of forms well known to those in the communication field or the keyless entry field. In this regard, the transceiver 64 is preferably tuned to an appropriate frequency to receive signals from, and transmit signals to, the mobile switching center (MSC) 12 through, for example, the base station 14. Moreover, it should be understood that the frequency at which the base station 14 and the transceiver 64 communicate may be selected to be within the typical wireless range or within the typical keyless entry range.

Again, the control module 54 preferably functions to receive the command signals from the base station 14. As noted above, the command signals contain sufficient message content to allow the control module 54 to recognize the selected vehicle function as well as vehicle identification information, such as a vehicle identification number (VIN).

As illustrated, control module 54 is connected to a lock module 56, an unlock module 58, a start module 60 and other function module 62. It should be appreciated that the modules 56, 58, 60 and 62 are merely shown in representative form. It is understood that these modules may well include other software routines and circuitry to accommodate requested vehicle functionality. However, this variety of routines and circuitry are well known to those of skill in the keyless entry field.

For example, U.S. Pat. No. 6,617,975 B1 to Burgess, U.S. Pat. No. 6,621,406 B2 to Kumano, U.S. Pat. No. 6,624,758 B1 to Omata, et al., U.S. Pat. No. 6,677,851 B1 to Losey, U.S. Pat. No. 6,522,029 B1 to Bell, et al., and U.S. Pat. No. 6,639,511 B2 to Haruna, et al. represent examples of keyless entry and/or remote start-up systems that are known to those in the field and are incorporated herein by reference. Again, other examples exist so the functionality described in FIG. 7 is simply a representative sampling.

Notably, it should be appreciated that a distinction between the modules illustrated in FIGS. 6 and 7 resides in the fact that the module 50 of FIG. 7 includes a transceiver, not merely a receiver. Therefore, the module 50 of FIG. 7 can communicate back to the mobile switching center (MSC) 12 through the base station 14 or any other base station. The communication module 66 facilitates the establishment of this communication path through the transceiver 64. For example, the communication module 66 may initiate the transmission of signals to register the vehicle (i.e. the transceiver 64 disposed on the module 50) on the wireless network. In this way, the transceiver on the module 50 allows for location of the vehicle 24—even if the vehicle 24 is not within the same cell area of the mobile device 16. This, of course, would allow subscribers to perform the same vehicle functions from a distance much greater than would be expected using the module of FIG. 6.

In addition, the communication module 66 may include functionality to send acknowledgement messages back to the mobile switching center (MSC) 12 through a nearby base station. As should be understood, the base station would not need to be the same base station through which the subscriber is communicating.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A system including a mobile switching center (MSC) for allowing a user to initiate a process for performing vehicle functions on a vehicle through a remote mobile communication device, the mobile switching center (MSC) comprising:
   a recognition module operative to recognize a request to initiate the process for performing the vehicle functions from the remote mobile communication device;
   an authentication module operative to authenticate that the user is valid and determine vehicles upon which the remote mobile communication device may initiate the vehicle functions;
   a query module operative to query the user through the remote mobile communication device as to which of the vehicle functions is to be performed; and,
   a communication module operative to transmit command signals to the vehicle to perform a selected vehicle function based on results of the query.

2. The system as set forth in claim 1 wherein the request comprises an activation code.

3. The system as set forth in claim 1 wherein the authentication module is operative to access mobile identification numbers (MINs) and vehicle identification numbers (VINs) stored in a subscriber database.

4. The system as set forth in claim 1 wherein the vehicle functions comprise at least one of locking doors on the vehicle, unlocking doors on the vehicle, and starting the vehicle.

5. The system as set forth in claim 1 further comprising a receiver disposed within the vehicle operative to receive the command signals from the communication module.

6. The system as set forth in claim 5 further comprising a control module disposed within the vehicle operative to initiate the selected function based on the command signals received by the receiver.

7. The system as set forth in claim 1 further comprising a transceiver disposed within the vehicle operative to receive the command signals from the communication module and transmit signals back to the communication module.

8. The system as set forth in claim 7 further comprising a control module disposed within the vehicle operative to initiate the selected function based on the command signals received by the transceiver.

9. The system as set forth in claim 8 further comprising a second communication module operative to provide information to the transceiver to transmit the signals.

10. A method allowing a user to initiate a process for performing vehicle functions on a vehicle through a mobile communication device in communication with a mobile switching center (MSC), the method comprising:
   receiving at the mobile switching center (MSC) a request to initiate the process for performing the vehicle functions using the remote mobile communication device;
   authenticating that the user is valid;
   determining vehicles upon which the remote mobile communication device may initiate the vehicle functions;

querying the user through the remote mobile communication device as to which of the vehicle functions is to be performed; and, transmitting command signals to the vehicle to perform a selected vehicle function based on results of the query.

11. The method as set forth in claim 10 wherein the receiving of the request to initiate comprises receiving an activation code.

12. The method as set forth in claim 10 wherein authenticating that the user is valid comprises accessing a subscriber database.

13. The method as set forth in claim 10 wherein the determining of vehicles upon which the mobile communication device may initiate the selected vehicle functions comprises accessing mobile identification numbers (MINs) and vehicle identification numbers (VINs) stored in a subscriber database.

14. The method as set forth in claim 10 wherein the vehicle functions comprise at least one of locking doors on the vehicle, unlocking doors on the vehicle, and starting the vehicle.

15. The method as set forth in claim 10 further comprising receiving the command signals from the communication module by a receiver disposed within the vehicle.

16. The method as set forth in claim 15 further comprising initiating the selected function based on the command signals received by the receiver.

17. The method as set forth in claim 10 further comprising receiving the command signals from the communication module by a transceiver disposed within the vehicle.

18. The method as set forth in claim 17 further comprising initiating the selected function based on the command signals received by the transceiver.

19. The method as set forth in claim 17 further comprising transmitting signals back to the communication module.

20. A system including a mobile switching center (MSC) for allowing a user to initiate a process for performing vehicle functions on a vehicle through a remote mobile communication device, the mobile switching center (MSC) comprising:

means for receiving a request to initiate the process for performing the vehicle functions from the remote mobile communication device;

means for authenticating that the user is valid;

means for determining vehicles upon which the remote mobile communication device may initiate the vehicle functions;

means for querying the user through the remote mobile communication device as to which of the vehicle functions is to be performed; and, means for transmitting command signals to the vehicle to perform a selected vehicle function based on results of the query.

21. The system as set forth in claim 20 further comprising means for receiving the command signals from the communication module, receiving means being disposed within the vehicle.

22. The system as set forth in claim 21 further comprising means for initiating the selected function based on the command signals received by the receiving means.

23. The system as set forth in claim 20 further comprising means for receiving the command signals from the communication module, the receiving means being disposed within the vehicle.

24. The system as set forth in claim 23 further comprising means for initiating the selected function based on the command signals received by the receiving means.

25. The system as set forth in claim 20 further comprising means for transmitting signals back to the communication module, the transmitting means being disposed within the vehicle.

* * * * *